Sept. 17, 1968   W. W. COOK   3,402,341
REMOTE CONTROL SYSTEM FOR WELDING GENERATOR
Filed Oct. 24, 1965
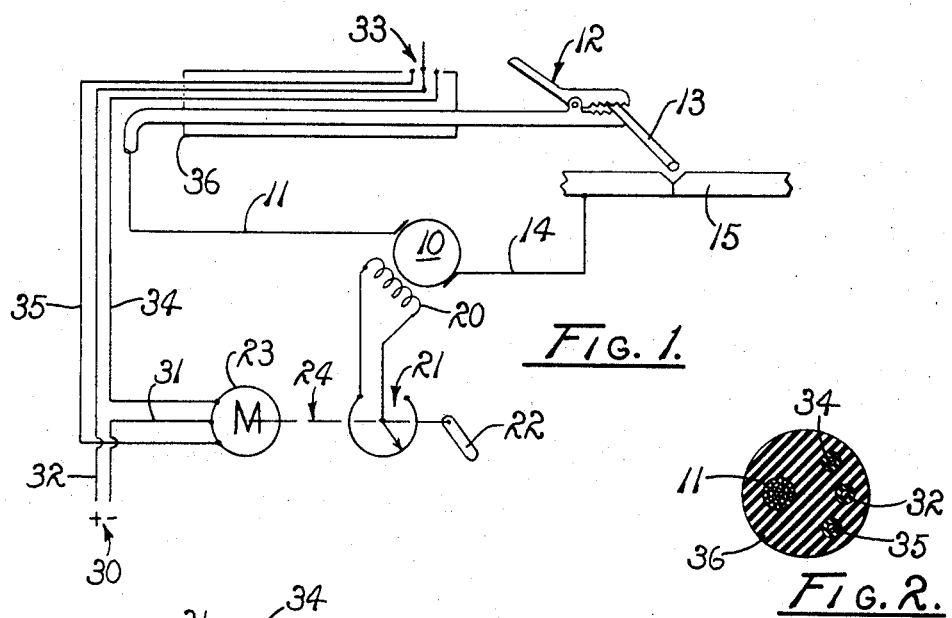
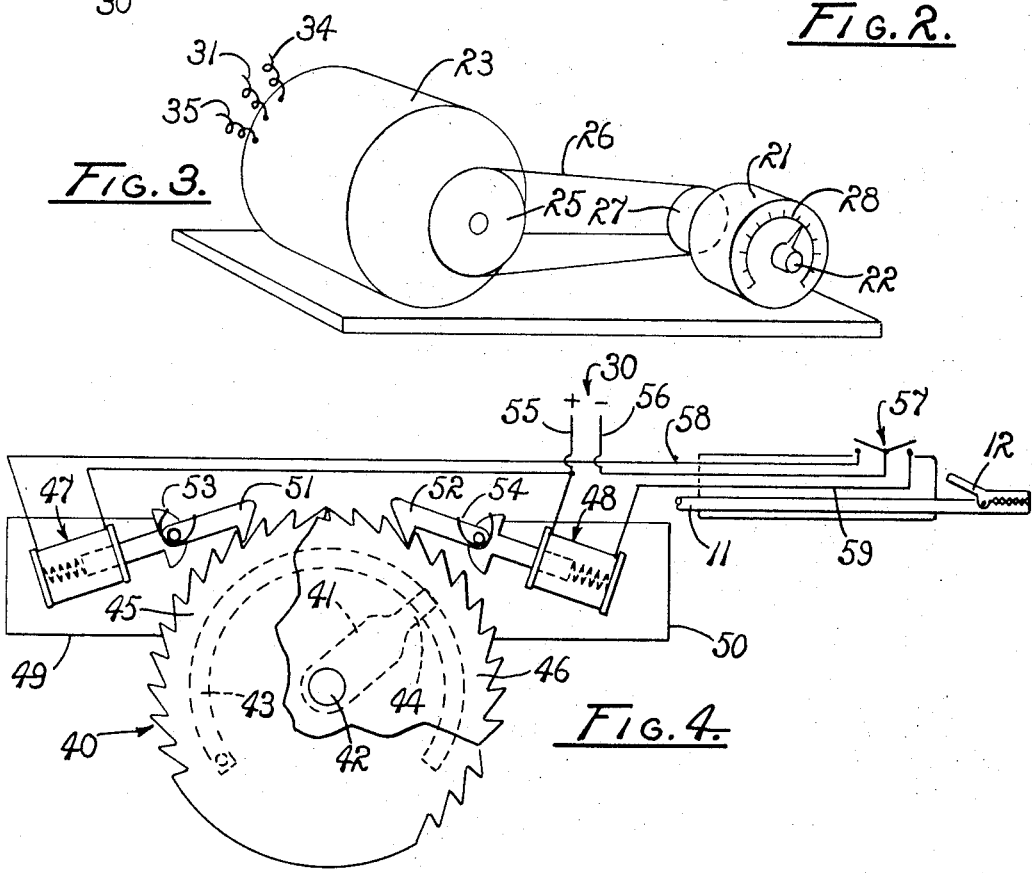
WOODROW W. COOK
INVENTOR
ATTORNEY

United States Patent Office 3,402,341
Patented Sept. 17, 1968

3,402,341
REMOTE CONTROL SYSTEM FOR WELDING
GENERATOR
Woodrow W. Cook, Bakersfield, Calif., assignor of one-half to Thelma Nelson, Bakersfield, Calif.
Filed Oct. 24, 1965, Ser. No. 504,535
5 Claims. (Cl. 322—16)

ABSTRACT OF THE DISCLOSURE

A control system for an electric generator having a load circuit, a field winding and a regulator rheostat, wherein the rheostat is provided with manually adjusted operator means and power driven operator means connected by an impositive drive to permit selective adjustment of the rheostat by either of the operator means.

---

This invention relates to a control system for electric generators and more particularly to engine and motor driven welding generators of the direct current type.

In certain environments it is necessary to change the output characteristics of an electric current generator while it is operating. An example of such an environment is a direct current welding generator where the welding operator is at a position remote from the generator and performing a wide variety of welding functions. Under these circumstances it is highly desirable, and usually necessary, to vary the amperage of the welding current in direct relation to the specific requirements of the article then being welded. This is particularly true in the case of light gauge sheet metal, which will warp badly, or even burn through, if the current is too high for the mass of the article being welded.

As those skilled in the art of welding are aware, a welding operator must frequently adjust the amperage output of the generator as the operating conditions warrant. In the event that the welding current is being generated by a portable engine driven generator, the operator normally makes a first estimate of the amperage or "heat" required for the work at hand. The conventional field regulating rheostat is then adjusted in correlation to this estimate, prior to striking an arc with the welding electrode.

As soon as the arc is struck, the operator determines from observation and experience whether the field control rheostat must be further adjusted to provide a welding current of the proper "heat." If adjustment is required, the usual procedure is to cease the welding operations, return to the generator, adjust the rheostat, and then return to the work area to resume welding. If further adjustment is necessary, this procedure must be repeated.

In like manner, adjustment is highly desirable and frequently necessary as th echaracter of a subsequent workpiece changes from a previous one for which the generator field rheostat was adjusted. Consequently, it is readily appreciated by operators of portable welding generators that an inability to adjust the generator output from a position remote from the generator is time-consuming, inefficient, and productive of non-uniform and/or poor quality welding.

In some forms of welding generators, particularly those driven by an internal combustion engine to enhance portable operation, a remote control is provided for the field regulating rheostat. Such controls utilize a portion of the current output of the generator as a motive force, which limits their utility and effectiveness. Examples of such controls are illustrated in United States Patents Nos. 2,642,515 and 3,041,526.

With certain forms of such controls, the welding arc must first be extinguished, prior to adjustment of the rheostat; in others, reversing stepping switches are utilized which permit the use of a single control switch, but tend to permit errors in direction of amperage adjustment.

In any event, a need has existed for a control system for electric welding generators which provides a flexibility of operation while maintaining a continuous arc and permits ready adjustment of the output of the generator from a position remote therefrom, as well as a manual rheostat control normally provided at the generator.

Accordingly, it is an object of the present invention to provide a control system for driven electric generators which permits continuous control of the generator output from a position remote therefrom.

Another object of the invention is to provide a remote control for a driven electric welding generator which can be adjusted during welding operations.

Another object is to provide such a control which can be manually over-ridden by a rheostat control mounted on the generator.

Another object is to provide a control system for a driven welding generator which can be moved in either direction to effect a desired increase or decrease in the amperage of the welding current, and such movements are made in uniform increments of advancement in the selected direction.

A further object is to provide a control for a welding generator which utilizes a source of power other than the generator, so that accurate adjustment of the welding current is permitted from either a control station at the generator or a station remote therefrom.

These, together with other objects, will become more fully apparent upon reference to the following description and accompanying drawing.

In the drawing:

FIG. 1 is a diagrammatic illustration of a welding generator circuit, including a field winding and rheostat provided with a control system embodying the principles of the present invention.

FIG. 2 is a transverse sectional view of a preferred form of conduit employed in the invention shown in FIG. 1 and incorporating a plurality of control conductors in an insulated sheath common to the conductor of the welding circuit.

FIG. 3 is an enlarged perspective view of one form of motor means employed to adjust the welding current from a position remote from the generator.

FIG. 4 is a diagrammatic representatin of a second form of motor means adapted to adjust the current from a welding generator portions of the welding control circuits being shown fragmentarily.

Referring more particularly to FIG. 1, a generator is schematically illustrated at 10, which, in contemporary portable welding units, is in the form of a direct current generator driven by a source of mechanical rotary power, such as an A.C. electrical motor or an internal combustion engine. One of the brush contacts of the generator is connected to an electrode cable 11 leading to an electrode holder 12, shown in a position supporting a welding electrode 13. Normally the electrode is of the consumable type for general welding operations. A "ground" cable leads from the other generator brush to a workpiece 15 to complete the welding circuit upon striking of an arc betwen the electrode 13 and the workpiece. The polarity of the cables is important only as to the type of generator and the welding materials. Since the control system of the present invention provides a separate control circuit external of the welding circuit, the polarity of the generator cables is of no significance.

A field winding for generator 10 is schematically illustrated at 20 and provided with a conventional regulating rheostat 21 having a manual control knob 22. As those skilled in the art of welding generators will appreciate, appropriate movement of the knob 22 effects a change in the field voltage, and consequently increases or decreases the amperage of the current in the welding circuit consisting of the cables 11 and 14, in conjunction with electrode 13 and workpiece 15.

A source of motive power in the form of reversible direct current motor 23 is connected to the rheostat 21 by an impositive drive 24. As shown in FIG. 3, one form of such an impositive drive includes a drive pulley 25 secured to the shaft of the motor 23 and a belt 26 trained about pulley 25 and a similar driven pulley 27 carried by the shaft of the rheostat 21. A calibrated indicator dial 28 is mounted on the rheostat as a visual reference of the selected amperage output of the generator.

An external source of energy indicated at 30 is provided and may be in the form of a storage battery normally provided on internal combustion engines, such as that driving the generator 10. Other sources of direct current, such as conventional rectifiers, may be used in the event that an alternating current motor is employed to drive the generator. The source of energy 30 is connected at one pole to the motor 23 through a ground conductor 31. The opposite pole is connected by a power control conductor 32 to a switch 33 mounted on electrode holder 12. The switch is of the single pole double throw type to permit alternate connection of the power conductor 32 to either a first control conductor 34 or a second control conductor 35, both of which are individually connected to the motor 23. All of the conductors, including the main electrode cable 11, the power conductor 32 and first and second control conductors 34 and 35, are carried in a common insulating sheath, a portion of which is shown at 36. This common insulating sheath precludes entanglement of the various conductors, such as would occur if they were loosely trained between their respective terminal points in their circuits. A transverse sectional view of such a common insulating sheath is shown in FIG. 2, and, except for terminal portions of each of the conductors, provides a single cable sheath for both the welding current and the rheostat control circuits.

OPERATION

The operation of the described embodiment of the subject invention is believed to be readily apparent and is briefly summarized at this point.

Assuming that the source of mechanical rotative power is operating to drive the generator 10, the welding operator selects an estimated current requirement by appropriate positioning of the manual control knob 22 of the rheostat 21. The operator then commences welding by striking an arc between electrode 13 and the workpiece 15. The length of the electrode cable 11 is frequently as long as 20 to 25 feet, so that the welding station is at a location quite remote from the manual control knob 22. Accordingly, it is impossible for the welding operator to adjust the rheostat 21 from the welding station, unless a remote control system, such as the present invention, is provided for the welding generator.

In the event that the preselected welding current is unsuited for the workpiece 15 or the electrode 13, the operator may increase or decrease the amperage of the welding current by appropriate movements of the switch 33. Upon selective closing of the switch, the reversible direct current motor 23 drives the rheostat toward a selected position of adjustment, so long as the switch is closed. Since the switch is of the spring loaded normally-open type, release of the switch by the welding operator stops operation of the motor 23 and maintains the rheostat 21 in a selected position of adjustment. It should be noted that the welding operator adjusts the "heat" of the arc during welding operations, and can visually observe immediate changes in the welding current. Consequently, this permits a more accurate selection of the proper welding current than heretofore possible.

In the event that any manual adjustment is desired at the generator station, the manual control knob 22 may be employed for this purpose, either by the welding operator or other attendant. In such event, the impositive drive 24, in the form of the friction belt 26 and associated pulleys 25, 27 permits such positioning of the rheostat without interfering with the remote control drive motor 23.

SECOND FORM

A second form of the invention is illustrated in FIG. 4 and includes a rheostat generally indicated at 40. A control knob 41 is mounted on a shaft 42 so that selective contact with a resistance winding 43 is made by a wiper contact 44. A first (increase) drive disk is nonrotatably secured to the shaft 42, and in like manner a second (decrease) drive disk is also secured to the shaft. Each of the disks is provided with respective solenoid ratchets 47, 48 secured to respective mounting plates 49, 50 carried by the generator frame, not shown. Both ratchets are provided with respective pawls 51, 52, having springs 53, 54 to permit ratcheting and to insure positive engagement of a respective pawl during operation of the individual solenoid ratchets.

As in the first form of the invention, a common conductor 55 is routed from one pole of the source of direct current 30 to both of the ratchet solenoids through respective branch conductors. The opposite pole of the source of electrical energy is connected through a power control conductor 56 to a normally-open switch 57 mounted on the electrode holder. One pole of the switch is connected to solenoid ratchet 47 by a first control conductor 58 and the other pole of the switch is connected to solenoid ratchet 48 through a second conductor 59.

The operation of the second form of the invention is substantially identical to that of the first form, except that movement of the rheostat 40 occurs in equal increments of adjustment in either direction, to increase or decrease the amperage of the welding current, depending upon the appropriate positioning of the switch 58. It will be appreciated that the switch must be intermittently closed to effect a ratcheting of the rheostat in either direction, since the solenoid of a ratchet must be de-energized to allow its respective pawl to return to a position from which it can engage the next successive tooth of its associated drive disk.

Accordingly, it can be seen that the present invention provides a control system for a welding generator which permits adjustment of the field regulating rheostat by a conventional control knob normally located on the generator, as well as control of the welding current from a position remote from the generator and immediately adjacent to the welding station. In the first form of the invention, the remote control is in the form of a reversible electrical motor under the influence of a switch mounted on the control holder. In the second form, the remote control includes opposite arranged ratchets, and permits uniform increments of adjustment. In both forms of the invention control of the welding current is at all times at the will of the operator and adjustment is permitted even during welding operations. Accordingly, the invention provides a remote control system which affords an ease of adjustment for the welding operator and greatly enhances the efficiency and quality of welding operations.

Having described my invention, what I claim as new and desire to secure by Letters Patent is:

1. In combination with an electric generator having a load circuit, a field winding and adjustable regulator rheostat therefor, including an adjustment shaft and manually operable knob secured thereto, a remote control for said field winding operably connected to said rheostat and comprising a source of electrical energy; reversible electric motor means; power transmission means connecting said motor means and said adjustment shaft so that operation of the motor means effects consequent movement of the shaft while permitting adjustment of the rheostat by said manually operable shaft independent of motor operation; a control switch remotely located from the generator; and control circuitry independent of said load circuit connecting said source of energy with the motor through said switch so that appropriate selective positioning thereof effects corresponding operation of the motor and consequent controlled adjustment of the current output of the generator through said rheostat during operation of said generator.

2. The combination according to claim 1 wherein said power transmission means includes a pair of cooperating frictional drive elements respectively secured to said motor and said rheostat adjustment shaft.

3. The combination according to claim 1 wherein said power transmission means comprises an output drive pulley carried by said motor, a driven pulley secured to the adjustment shaft of said rheostat; and a drive belt trained about said pulleys in frictional contact therewith.

4. A control system for an electric welding generator having a welding circuit including an electrode cable leading to an electrode holder supporting an electrode therein and having a second cable connected to a workpiece so that the welding circuit is completed upon contact of the workpiece by the electrode, the generator having a field winding and a regulator rheostat therefor including a control shaft and a manual adjustment knob secured thereto, the control system being adapted for selective adjustment of the current in said welding circuit during welding operations and comprising a reversible direct current motor mounted on the generator, the motor being provided with three terminals and having a drive pulley extended therefrom; a driven pulley secured to said control shaft; a power transmission belt trained about said pulleys and being under sufficient tension to transmit power from the drive pulley to the driven pulley while permitting movement of the control shaft and adjustment of the rheostat by said manual knob; a source of electrical energy remote from said welding circuit; a single pole double throw switch mounted on said electrode holder and having a center tap; a ground conductor connected between said source and one of the terminals of said reversible motor; a power conductor connected between said source and the center tap of said switch; first and second control conductors connected between said switch and the remaining two terminals of said motor; and a common insulating sheath for said electrode cable, said power conductor, and said first and second control conductors so that a single sheathing is provided for the electrodes extending between the generator and the electrode holder.

5. In combination with an electric welding generator having a field winding and a regulator rheostat therefor including a control shaft and a manual adjustment knob secured thereto, a welding circuit including an electrode cable leading to an electrode holder supporting an electrode therein and a second cable connected to a workpiece so that the welding circuit is completed upon contact of the workpiece by the electrode; a power control for selectively moving said rheostat control shaft in either circumferential direction in substantially uniform increments of advancement and including a pair of ratchet solenoids having respective pawls and respective pairs of terminals; means carried by the generator to support the ratchet pawls in opposed, circumferentially spaced positions relative to said control shaft; a pair of drive disks provided with respectively oppositely inclined peripheral teeth adapted for respective engagement with said pawls, the disks being non-rotatably mounted on said shaft in respective axially spaced planes for engagement by a respective one of the pawls; resilient means carried by the ratchet solenoids to urge each of the pawls into engagement with a respective drive disk; a source of electrical energy remote from said welding circuit; a single pole double throw switch mounted on said electrode holder and having a center tap; a ground conductor connected between said source and a respective one of the terminals of both of said ratchet solenoids; a power conductor connected between said source and the center tap of said switch; a first control conductor connected between said switch and the remaining terminal of one of said ratchet pawls; and a second control conductor connected between said switch and the remaining terminal of the other of said ratchet pawls so that appropriate closing of the switch effects an incremental advance of the rheostat shaft in a direction determined by the solenoid then energized through the switch from the source of energy.

References Cited
UNITED STATES PATENTS

| 2,734,116 | 2/1956 | Rybolt | 322—16 X |
| 2,189,603 | 2/1940 | Graham | 322—80 |
| 2,297,578 | 2/1942 | Noddings | 322—80 |
| 2,438,634 | 3/1948 | Farrow | 322—80 |
| 2,637,013 | 4/1953 | Pestarini | 322—80 |

ORIS L. RADER, *Primary Examiner.*

H. HUBERFELD, *Assistant Examiner.*